No. 896,222. PATENTED AUG. 18, 1908.
P. MacGAHAN.
ELECTRICAL MEASURING INSTRUMENT.
APPLICATION FILED NOV. 23, 1906.

3 SHEETS—SHEET 1.

WITNESSES:
C. L. Belcher
Otto S. Schairer

INVENTOR
Paul MacGahan
BY
Wesley G. Carr
ATTORNEY

No. 896,222.

PATENTED AUG. 18, 1908.

P. MacGAHAN.
ELECTRICAL MEASURING INSTRUMENT.
APPLICATION FILED NOV. 23, 1906.

3 SHEETS—SHEET 3.

WITNESSES:
C. L. Belcher
Otto S. Schairer

INVENTOR
Paul MacGahan
BY
Wesley G. Carr
ATTORNEY

UNITED STATES PATENT OFFICE.

PAUL MacGAHAN, OF WILKINSBURG, PENNSYLVANIA, ASSIGNOR TO WESTINGHOUSE ELECTRIC & MANUFACTURING COMPANY, A CORPORATION OF PENNSYLVANIA.

ELECTRICAL MEASURING INSTRUMENT.

No. 896,222.      Specification of Letters Patent.      Patented Aug. 18, 1908.

Application filed November 23, 1906. Serial No. 344,746.

*To all whom it may concern:*

Be it known that I, PAUL MACGAHAN, a citizen of the United States, and a resident of Wilkinsburg, in the county of Allegheny and State of Pennsylvania, have invented a new and useful Improvement in Electrical Measuring Instruments, of which the following is a specification.

My invention relates to electrical measuring instruments, and particularly to those in which a continuous record is made of the values of the quantities measured.

The object of my invention is to provide a recording wattmeter or similar instrument that shall be specially adapted for use in connection with direct current circuits in which the currents are of such high values that they may not be conveniently measured except by connecting the current windings of the instruments in shunt to resistance devices in the circuits.

In order to measure the power that traverses an electrical circuit it is necessary to combine and measure the resultant of two forces that are proportional, respectively, to the current in and the voltage of the circuit. When a large amount of current traverses a circuit a device of comparatively high and definitely known resistance may be connected in series with one of the circuit conductors and current proportional in value to that traversing the circuit may be supplied to the current winding of the instrument by connecting the same in shunt to the device. In a direct current instrument it is permissible to provide magnetizable cores for the voltage winding, and desirable also, because the magnetic fluxes may thus be concentrated and such small amounts of energy as are obtainable when the current windings are connected in shunt to resistance devices, as indicated, may be utilized to effect satisfactory operation of the instrument. However, because of the hysteresis of the magnetizable cores, the accuracy of the instrument in recording variations in the amounts of power may be impaired, and it is the specific object of the present invention to provide means whereby the effect of hysteresis upon the accuracy of an instrument may be obviated.

Figure 1:
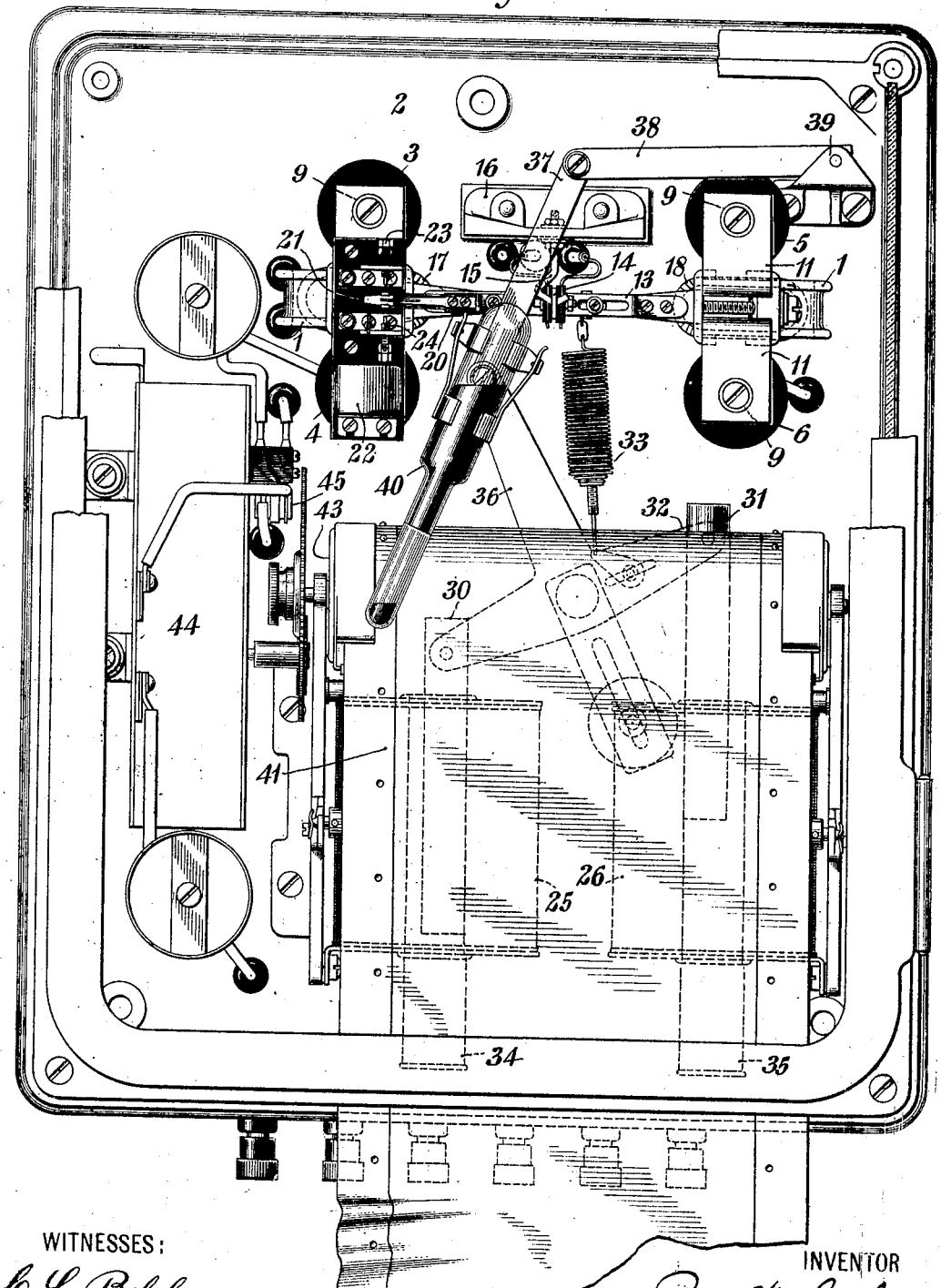
Figure 2:
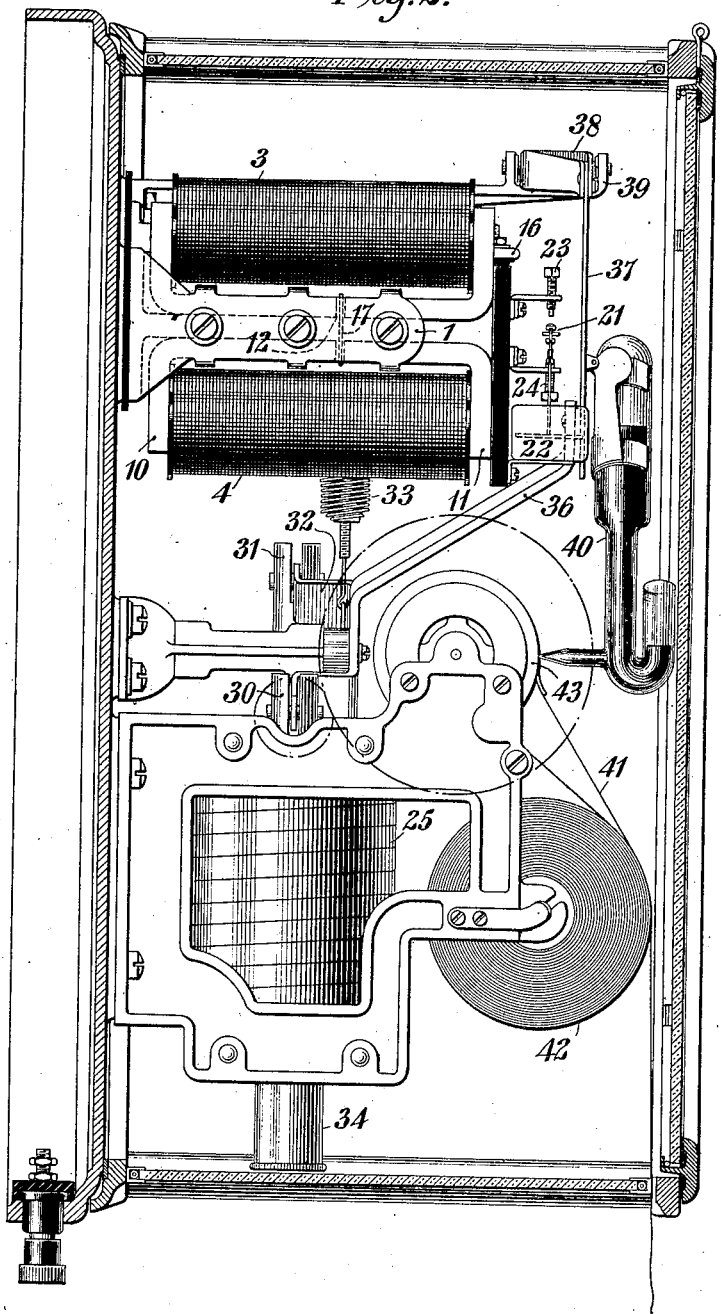
Figure 3:
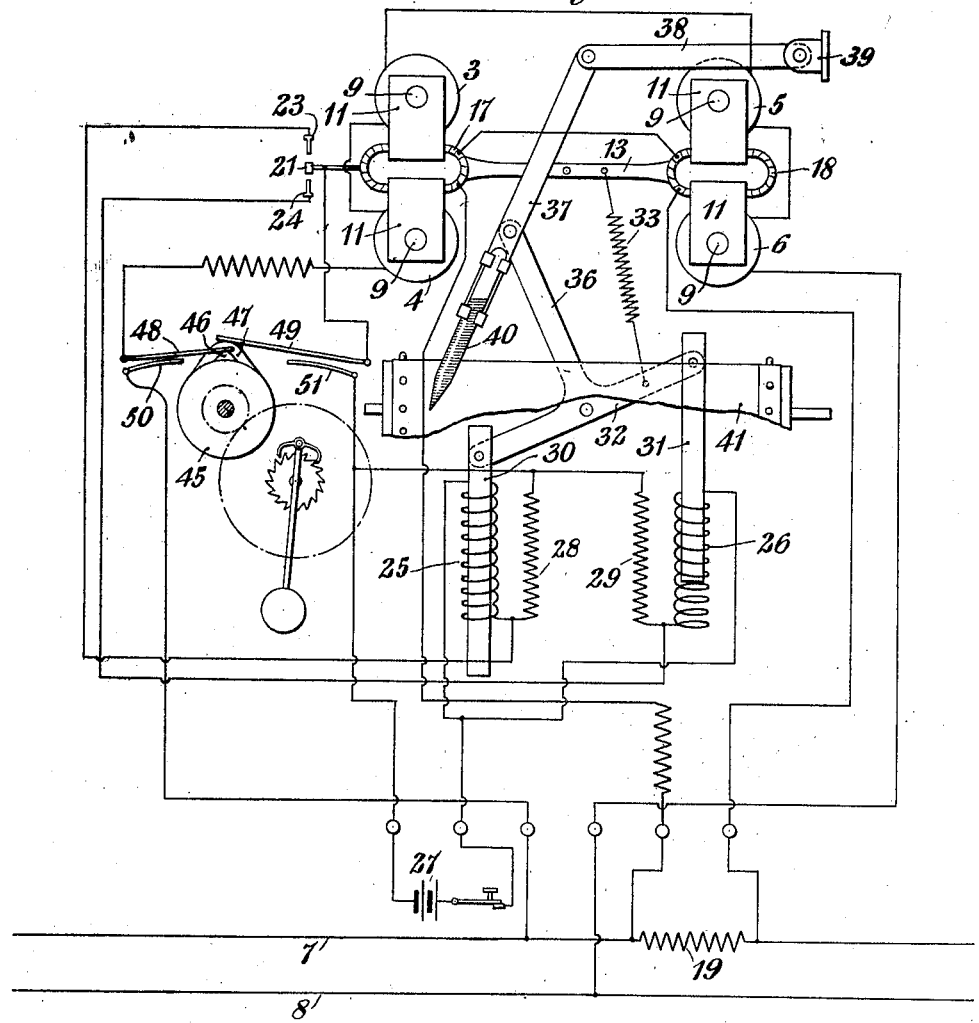
Figure 4:
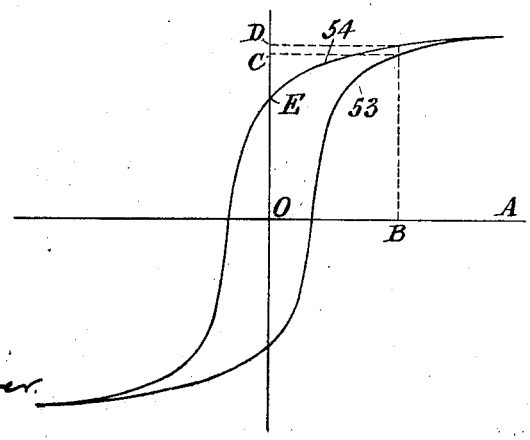

Figure 1 of the accompanying drawings is a face view of an instrument that embodies my invention, some of the parts being broken away for the sake of clearness of illustration. Fig. 2 is a view, in side elevation, of the instrument shown in Fig. 1, the case being shown in section. Fig. 3 is a diagrammatic view of the connections of the instrument, and Fig. 4 is a diagram that has been found useful in explaining the operation of the invention.

Secured by means of brackets 1 to the back of a casing 2, within which the instrument is inclosed, are solenoids 3, 4, 5 and 6 that are connected in series relation between circuit conductors 7 and 8 to constitute the voltage winding of the instrument. Each coil is provided with a magnetizable core comprising a cylindrical portion 9 upon which the coil is mounted, and pole pieces 10 and 11 that are secured, respectively, to the ends of the cylindrical portion, the said pole pieces being formed from flattened or strap material and bent about the exterior of the coil so as to provide an air gap at 12 between the end faces thereof. Carried at the extremities of a frame 13 that is pivotally mounted by means of knife-edge bearings 14 upon hooks 15 which are pendent from a stationary bracket 16, are two oblong coils 17 and 18 that are connected in series relation between the terminals of a resistance device 19 which is included in series circuit with conductor 7, the coils 17 and 18 being in this manner supplied with current proportional in amount to that which traverses the conductor 7. The frame 13 carries an arm 20 flexibly mounted upon the free end of which is a contact member 21, the piston of a dashpot 22 being connected to the contact member for the purpose of damping the oscillations thereof and of the movable member. The contact member 21 is capable of an oscillatory movement between the ends of two screws 23 and 24 that constitute stationary contact terminals and are connected, respectively, to corresponding terminals of a pair of solenoids 25 and 26, the other terminals of which may be connected to a battery 27, or other suitable source of energy preferably, though not necessarily, independent of the circuit 7—8. Two resistances 28 and 29 are connected, respectively, between the other terminal of the battery and the terminals of the solenoids 25 and 26 that are connected to the stationary contact terminals 23 and 24, the said resistances being employed for the purpose of absorbing the inductive discharges that occur when the circuit is interrupted.

The coils 25 and 26 are provided with magnetizable cores 30 and 31 that are carried at opposite extremities of a rocking beam 32, the rocking beam being connected to the frame 13 by means of a helical tension spring 33 that serves to counter-balance the forces exerted between the stationary and movable coils of the instrument. The cores 30 and 31 operate within tubular receptacles 34 and 35 that are surrounded by the coils 25 and 26 and that preferably contain a liquid for damping the movements of the parts. The rocking beam 32 is provided with an upwardly extending arm 36, the free end of which is pivotally secured to an intermediate point of a lever 37, the upper end of which is pivotally connected to one end of a link 38 that is, in turn, pivoted at its other end to a stationary bracket 39. The lever 37 carries, at its lower end, a pen or other marking device 40, the point of which may be moved across the face of a record strip 41 that is drawn from a supply roll 42 by means of a feed or platen roll 43, the parts 36, 37 and 38 being so proportioned that the point of the pen will be moved horizontally in a straight line. The feed roll 43 is operated at a substantially constant rate by means of clock-work contained within a frame 44, the exact character of which it has been deemed unnecessary to fully illustrate and describe because such devices are old in the art. The clock work also operates a cam 45 that preferably makes one revolution per minute, though it may be revolved at any other desired or suitable rate, and is provided with two projections 46 and 47, the latter of which is of somewhat greater angular width than the former. The periphery of the cam is engaged by brushes 48 and 49 that are connected, respectively, to one terminal of the coil 4 and to the flexible contact member 21, the brush 48 being in the plane of the projection 46 and the brush 49 in the plane of the projection 47.

The brushes 48 and 49 normally engage terminal pieces 50 and 51, respectively, but are periodically raised out of engagement therewith by means of the cam projections 46 and 47, the brush 49 being disengaged from the terminal 51 before the brush 48 is disengaged from the terminal 50 and is permitted to reëngage the said terminal subsequent to reëngagement of the members 48 and 50. The terminals 50 and 51 are connected, respectively, to the circuit conductor 7 and to one terminal of the battery 27. Thus, it is seen that the circuit of the coils 3, 4, 5 and 6 is periodically interrupted, and also the circuits of the coils 25 and 26 that actuate the recording mechanism of the instrument, the latter circuits being broken prior to the former, and again completed subsequently to the former, in order that movements of the recording mechanism may not occur while the circuit of the coils 3 to 6, inclusive, is interrupted.

If, during the operation of the instrument, the amount of power traversing the circuit 7—8 increases, the contact member 21 will be caused to engage stationary contact terminal 24, and a circuit will become established through solenoid 26. The core 31 will then be drawn downwardly and cause movement of the pen 40 from left to right across the face of the record strip 41 until the tension of the spring 33 counterbalances the forces exerted between the coils 3, 4, 5 and 6 and the coils 17 and 18, whereupon the members 21 and 24 will be disengaged. If the power traversing the circuit 7—8 decreases, the contact member 21 is caused to engage the stationary terminal 23 and the circuit of magnet winding 25 becomes established. The core 30 is then drawn downwardly and the pen 40 is moved from right to left across the face of the record strip 41 until the tension of the spring 33 is reduced so as to counter-balance the smaller forces that are now exerted between the stationary and movable coils of the instrument. The effect of the hysteresis of the magnetizable cores for the coils 3, 4, 5 and 6 is overcome by interrupting the circuit of the coils periodically, so that the density of the flux in the cores is caused to increase periodically from the flux density of the residual magnetism to the value corresponding to the voltage existing between the circuit conductors 7 and 8. This will be readily understood from a consideration of Fig. 4 which is an ordinary hysteresis curve. The values of the flux density when the voltage of the circuit 7—8 increases to a value represented by the abscissa OA follows a line 53 and when the voltage decreases the values of the flux density follow a line 54. Thus, if, with an increasing voltage, the instantaneous voltage is represented by the abscissa OB, the flux density will be equal to the ordinate OC, while with a decreasing voltage the flux density is represented for the same voltage value by the ordinate OD. Consequently, if the circuit of the voltage coils of the instrument were maintained constant, the record produced by the instrument would be inaccurate to an extent that is represented by the hysteresis of the magnetizable cores of the coils. Periodic interruption of the circuit of the coils, in accordance with the present invention, causes the flux density to return periodically to a value represented by the ordinate OE and to always increase from that value along the line 54 to another value that represents the voltage of the circuit 7—8.

While the invention has been shown and described as applied to a wattmeter, it will, of course, be understood that it is not restricted in its application to such specific use, and that it is not limited to such structural details and arrangements of the parts as are here specifically set forth.

I claim as my invention:

1. In an electrical measuring instrument, the combination with an electro-magnet in a normally closed circuit and a coil relatively movable in the field thereof, of means for periodically and momentarily interrupting the circuit of the electro-magnet.

2. In an electrical measuring instrument, the combination with an electro-magnet and a coil relatively movable in the field thereof, of a recording mechanism, electro-magnetic actuating means therefor, and means for periodically interrupting the circuits of the electro-magnet and of the electro-magnetic actuating means.

3. In an electrical measuring instrument, the combination with an electro-magnet and a coil relatively movable in the field thereof, of a recording mechanism, electro-magnetic actuating means therefor, and means for periodically interrupting the circuits of the electro-magnet actuating means, the latter circuit being broken previously to and closed subsequently to the former circuit.

4. The combination with supply circuit conductors, and a measuring instrument comprising an electro-magnet having a winding that is connected between the supply circuit conductors and a coil relatively movable in the field thereof that is traversed by current proportional in amount to that which traverses the supply circuit, of means for periodically interrupting the circuit of the electro-magnet winding.

5. The combination with supply circuit conductors, and a measuring instrument comprising an electro-magnet having a winding that is connected between the supply circuit conductors and a coil relatively movable in the field thereof that is traversed by current proportional in amount to that which traverses the supply circuit, of recording mechanism, actuating means therefor, and means for periodically rendering the same inoperative and for interrupting the circuit of the electro-magnet winding.

6. The combination with supply circuit conductors, and a measuring instrument comprising an electro-magnet having a winding that is connected between the supply circuit conductors and a coil relatively movable in the field thereof that is traversed by current proportional in amount to that which traverses the supply circuit, of recording mechanism, actuating means therefor, and means for periodically rendering the same inoperative and for interrupting the circuit of the electro-magnet winding, the recording mechanism actuating means being rendered inoperative prior to and restored to operativeness subsequently to the interruption of the circuit of the electro-magnet winding.

In testimony whereof, I have hereunto subscribed my name this 6th day of November, 1906.

PAUL MacGAHAN.

Witnesses:
WM. BRADSHAW,
BIRNEY HINES.